A. J. O'BRIEN.
BRAKE MECHANISM.
APPLICATION FILED AUG. 21, 1912.

1,092,162.

Patented Apr. 7, 1914.
2 SHEETS—SHEET 1.

WITNESSES:
F. C. Matheny
Geo. Blair

INVENTOR
Asher J. O'Brien
BY
C. D. Haskins
ATTORNEY

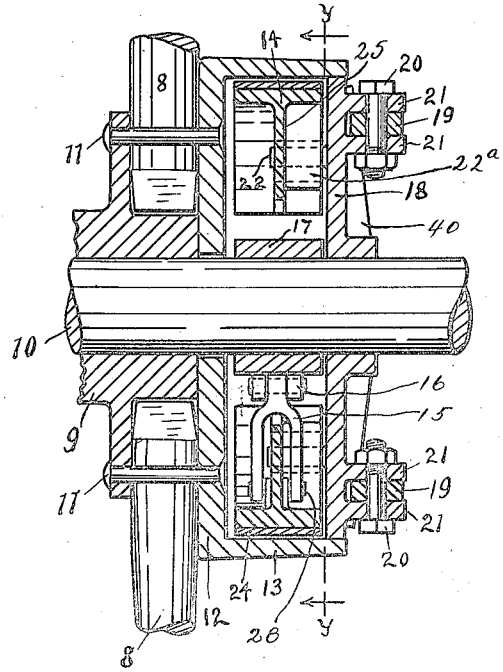
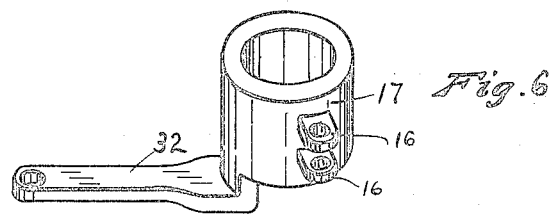
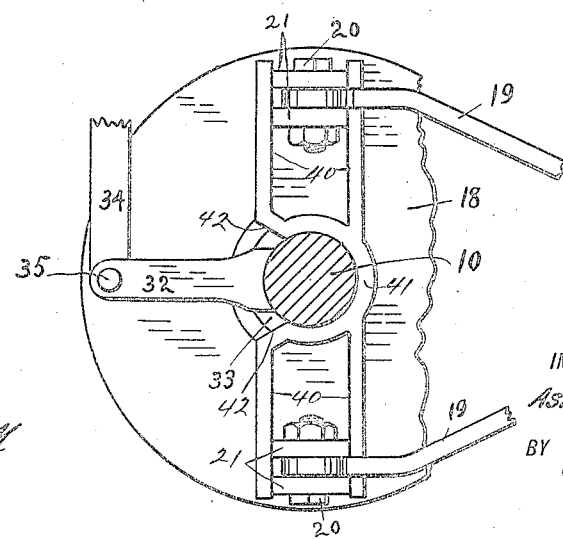

UNITED STATES PATENT OFFICE.

ASHER J. O'BRIEN, OF SEATTLE, WASHINGTON.

BRAKE MECHANISM.

1,092,162.  Specification of Letters Patent. Patented Apr. 7, 1914.

Application filed August 21, 1912. Serial No. 716,228.

*To all whom it may concern:*

Be it known that I, ASHER J. O'BRIEN, citizen of the United States, residing at Seattle, in the county of King and State of Washington, have invented a certain new and useful Improvement in Brake Mechanism, of which the following is a specification.

This invention relates to brake mechanism.

The objects of the invention are to provide a mechanism that shall be adapted to be used as a brake in connection with the running-gear of automobiles, auto-trucks and fire fighting apparatus, and that shall be strong, effective, readily controlled and shall require the application of little force in its operation.

Figure 1:
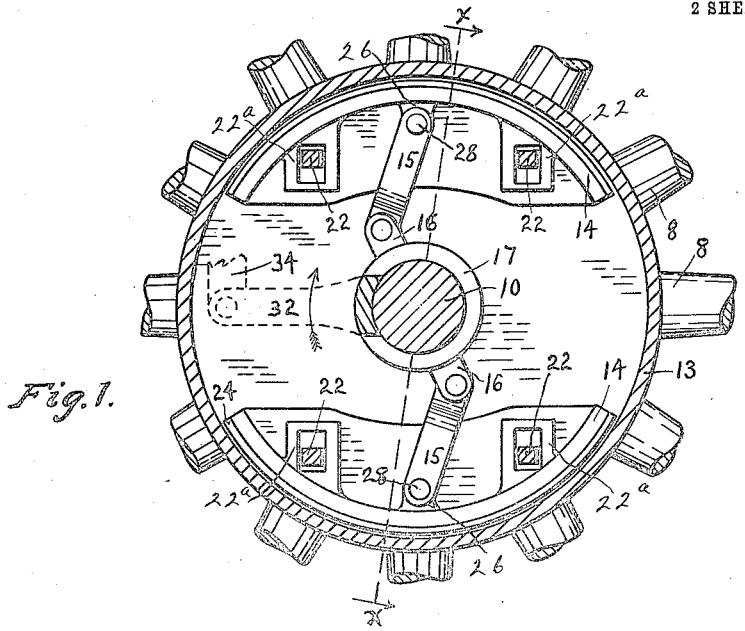
Figure 2:
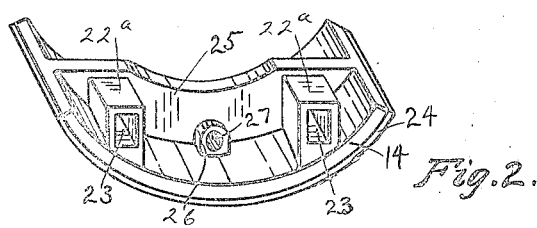
Figure 3:
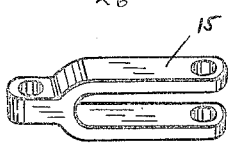
Figure 4:
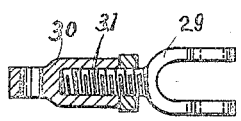

I attain these objects by devices illustrated by the accompanying drawings, in which:

Figure 1 is a view in side elevation, partly in section, of a structure embodying the invention, the section being taken on the line Y—Y, Fig. 5. Figs. 2 and 3 are perspective views of details of the brake. Fig. 4 is a view in side elevation, partly in section, of a modified form of a detail of the brake. Fig. 5 is a view in vertical longitudinal section taken on the line X—X, Fig. 1. Fig. 6 is a perspective detail view of an element of the brake. Fig. 7 is a view in side elevation of a part of the brake.

Like reference numerals indicate like parts throughout the drawings.

Referring to the drawings, Figs. 1 and 5, the spokes 8, of a wheel extend from a hub 9 which is mounted on an axle 10 of a truck not shown. To the hub 9 and concentric therewith is bolted, by bolts 11, a disk 12 provided with a projecting brake-rim 13. The inner surface of the brake-rim 13 is concentric with the axle 10 and may serve as a friction surface with which brake-shoes 14 may engage, the latter being faced with green-hide or leather 24 which may be replaced from time to time as it wears away. While two brake-shoes are shown in Figs. 1 and 5, a greater number might be employed with advantage in larger sizes of brakes. The brake-shoes 14, disposed within the brake-rim 13 to engage with the inner surface thereof, are connected by links 15 with lugs 16 which project from a hub 17 that is loosely mounted on axle 10, as shown more clearly in Fig. 1. The length of links 15 are such that when the hub 17 is turned in a direction indicated by the arrow, in Fig. 1, the brake-shoes 14 are thrust against the inner surface of the brake-rim 13.

Mounted freely on the axle 10 adjacent to the brake-shoes 14 is a holding-plate 18 which is rigidly secured and prevented from turning by means of stay-rods 19 which are connected by bolts 20 each to lugs 21 disposed adjacent to opposite edges of and integral with the holding plate 18 from which lugs 21 the stay-rods 19 may extend to the running-gear of a truck not shown.

The holding-plate 18 is provided with projecting studs 22 of square cross-section which extend from its sides into rectangular recesses 23 which are formed in bosses $22^a$ integral with the brake-shoes 14, the construction of which brake-shoes 14 is more clearly shown in Fig. 2. These recesses 23 are oblong whereby the brake-shoes may move radially with respect to the holding-plate 18 and thus engage with and be drawn from engagement with the inner surface of the brake-rim 13 but whereby such brake-shoes 14 may not be permitted to move circumferentially with respect to said holding-plate 18.

In order to strengthen the brake-shoes 14 each is provided on its concave side with a web 25 and to afford means for connecting the link 15 with the brake-shoes 14 there is formed on each side of said web 25 a boss 26 through which extends a hole 27 wherein may be disposed the link-pin 28.

One of the links 15 is shown in perspective in Fig. 3 and in such link the distance between the center of the holes in its respective ends is a fixed distance allowing no adjustment or change of distance between the hub 17 and the link-pin 28 to compensate for the wearing away of the brake-shoe 14 but such adjustment in many cases may be unnecessary. If, however, it be desired, a modified form of link may be substituted for the link 15 and I have shown one modified form of such link in Fig. 4 wherein an adjustable link comprising two parts 29 and 30, respectively, the part 29 being adapted to connect with the brake-shoe 14 and provided with a shank 31 adapted by a screw-thread to screw into the part 30 which is adapted to be connected to the lugs 16 on the hub 17 whereby a half turn of the screw-thread will cause the length of such modified form of links to be changed.

From one end of the hub 17 extends an arm 32 through an opening 33 in the holding-plate 18, said opening having the form of a segment of a circle whereby such arm 32 in operating to turn the hub 17 on the axle 10 may not be obstructed in such operation by the holding-plate 18. This arm 32 extending outwardly through the opening 33 is bent at a right angle with respect to the axis of the hub 17 and the end of such arm 32 is connected, as shown in Fig. 7, with a brake-rod 34 indicated by fragmentary view, such brake-rod 34 being designed to extend from the end of the arm 32, to which it is articulated, by pivot-pin 35, to a brake-lever, not shown, of some well known form.

Figs. 1 and 7 clearly show the relative positions of the arm 32, brake-rod 34 and the hub 17, dotted lines in Fig. 1 indicating said arm 32 and brake-rod 34, and such Figs. 1 and 7 make obvious the mode of operation of my invention wherein when the brake-rod 34 is caused to act on the arm 32 to move the hub 17 in the direction of the arrow shown in Fig. 1 then the links 15 communicate pressure against the brake-shoes 14 to exert great friction between such brake-shoes 14 and the brake-rim 13 thus tending to impede the rotary motion of the brake-rim 13, and the wheel-hub 9 to which it is bolted, while a movement of said brake-rod 34 which acts to cause the arm 32 to move the hub in an opposite direction, may withdraw the brake-shoes 14 from engagement with said brake-rim 13 in an obvious manner. Outwardly projecting strengthening ribs 40 are provided upon the outer face of the holding plate 18 and these substantially connect the opposite ends of the lugs 21 and provide a circular inclosure or bearing 41 for the axle 10 while an interrupted portion is provided with the opposite shoulders 42 which act as stops for the opening and closing movement of the lever 32. Thus the wheel of a vehicle when associated with a structure containing my invention, as shown, may be fully controlled by a brake-lever or other suitable device acting to operate the brake-rod 34 and, moreover, the brake-shoes 14, links 15, hub 17 and holding-plate 18 may be embodied in a friction clutch device that is adapted to communicate or intercept rotary motion from one shaft to another of various kinds of machinery.

Manifestly different modifications of the several parts of my invention, with respect to size and form may be made without departing from the spirit of such invention.

What I claim is:

A brake comprising in combination with a wheel hub mounted upon the revoluble axle of a vehicle, of a brake rim rigidly secured to said hub, a holding plate closingly positioned within said rim and provided with an opening for receiving said axle therethrough, means for rigidly securing said holding plate to the vehicle, a plurality of brake shoes disposed within said rim, lugs positioned upon the inner face of said plate, housings provided upon said shoes and having recesses therein for slidably-receiving said plate lugs, a turn-hub upon said axle, lever means between said hub and shoes, rearwardly-extending flanges radially positioned upon the outer face of said plate, a circular flange adapted for journaling said axle, an off-set lever arm secured to said turn-hub and extending outwardly of said plate and between said flanges thereof, and interrupted stop members for limiting the movement of said lever arm.

In witness whereof, I, hereunto subscribe my name this 23rd day of July A. D., 1912.

ASHER J. O'BRIEN.

Witnesses:
A. J. SPECKERT,
A. EKLUND.